US008892805B2

(12) United States Patent
McGee (10) Patent No.: US 8,892,805 B2
(45) Date of Patent: Nov. 18, 2014

(54) HIGH PERFORMANCE SYSTEM THAT INCLUDES RECONFIGURABLE PROTOCOL TABLES WITHIN AN ASIC WHEREIN A FIRST PROTOCOL BLOCK IMPLEMENTS AN INTER-ASIC COMMUNICATIONS PROTOCOL AND A SECOND BLOCK IMPLEMENTS AN INTRA-ASIC FUNCTION

(71) Applicant: Silicon Graphics International Corp., Fremont, CA (US)

(72) Inventor: Thomas Edward McGee, Eau Claire, WI (US)

(73) Assignee: Silicon Graphics International Corp., Milpitas, CA (US)

( * ) Notice: Subject to any disclaimer, the term of this patent is extended or adjusted under 35 U.S.C. 154(b) by 0 days.

(21) Appl. No.: 13/788,281

(22) Filed: Mar. 7, 2013

(65) Prior Publication Data

US 2014/0258679 A1 Sep. 11, 2014

(51) Int. Cl.
*G06F 13/00* (2006.01)

(52) U.S. Cl.
USPC ............. 710/313; 710/11; 710/12; 710/13; 710/14; 710/15; 710/104; 710/305; 710/316; 711/108; 711/160

(58) Field of Classification Search
USPC ................. 710/11–15, 104, 305, 313, 316
See application file for complete search history.

(56) References Cited

U.S. PATENT DOCUMENTS

| 4,532,606 | A | 7/1985 | Phelps ........................... 365/49 |
|---|---|---|---|
| 5,125,098 | A | 6/1992 | Burrows ....................... 395/800 |
| 6,792,502 | B1 | 9/2004 | Pandya et al. ................. 711/108 |
| 7,061,272 | B2 | 6/2006 | Wilkes et al. .................. 326/46 |
| 7,173,452 | B2 | 2/2007 | Folsom .......................... 326/46 |
| 7,281,083 | B2 * | 10/2007 | Madajczak ................... 711/108 |
| 7,596,745 | B2 | 9/2009 | Dignum et al. ............... 715/234 |
| 8,347,019 | B2 * | 1/2013 | Bueti et al. .................... 710/316 |
| 2007/0113170 | A1 | 5/2007 | Dignum et al. ............... 715/513 |

OTHER PUBLICATIONS

Herlihy, et al., "Hardware Transactional Memory," Presentation by Royi Maimon & Merav Havuv; prepared for a seminar given by Prof Yehuda Afek. 37 pages, 1993.

* cited by examiner

*Primary Examiner* — Tammara Peyton
(74) *Attorney, Agent, or Firm* — Sunstein Kann Murphy & Timbers LLP (57) ABSTRACT

A high performance computing system is provided with an ASIC that communicates with another device in the system according to a protocol defined by the other device. The ASIC is coupled to a reconfigurable protocol table, in the form of a high speed content-addressable memory ("CAM"). The CAM includes instructions to control the execution of the protocol by the ASIC. The CAM may include instructions to control the ASIC in the event that unanticipated signals or other errors are encountered while executing the protocol. Internal ASIC state data may be routed to the CAM to permit the ASIC to generate a reasonable response to errors either in the design or fabrication of the ASIC or the device with which it is communicating.

16 Claims, 7 Drawing Sheets

HIGH PERFORMANCE SYSTEM THAT INCLUDES RECONFIGURABLE PROTOCOL TABLES WITHIN AN ASIC WHEREIN A FIRST PROTOCOL BLOCK IMPLEMENTS AN INTER-ASIC COMMUNICATIONS PROTOCOL AND A SECOND BLOCK IMPLEMENTS AN INTRA-ASIC FUNCTION

FIELD OF THE INVENTION

The invention generally relates to electrical computer processing architecture and, more particularly, the invention relates to application specific integrated circuits having programmable tables for facilitating communications with other such integrated circuits and with computing processors.

BACKGROUND OF THE INVENTION

In distributed processing systems, multiple processors communicate with each other and with memory devices to perform a shared computation. Because the types of computations involved are generally very complex or require a great deal of processing power, this type of communication must be very high speed. Therefore, it is generally accomplished using high-speed local data networks. In high-performance computing ("HPC") systems, further speed increases are achieved using specialized hardware that is not generally available commercially off-the-shelf for use in, for example, desktop or server computers. This specialized hardware includes application-specific integrated circuits ("ASICs") having a number of communications channels for communicating with each other, and with the processors, memory, and other specialized hardware unique to such tightly-coupled systems.

Communications protocols are defined to permit these various devices to communicate with one another. For instance, Intel Corporation of Santa Clara, Calif. has offered processors that communicate using the Intel® QuickPath Interconnect ("QPI") protocol, and Advanced Micro Devices, Inc. of Sunnyvale, Calif. has offered processors that communicate using the HyperTransport protocol developed by the HyperTransport Consortium, also of Sunnyvale, Calif. HPC manufacturers may design ASICs to communicate using these protocols, or define high speed, low latency protocols for their ASICs to use with one another, or with other HPC hardware. The communications protocol between the ASIC and a processor or a memory may be modeled as a finite state machine.

HPC systems are generally custom-built and manufactured to provide the fastest hardware capabilities possible. Therefore, the ASICs of HPC systems known in the art execute protocol tables that are encoded directly into hardware. Hardwired tables are advantageous for their high speed. However, if the tables are incorrectly designed or their hardware is incorrectly manufactured, they require new chips to be fabricated at considerable expense and delay in time-to-market. Moreover, some devices with which an ASIC may communicate may not conform to published protocol specifications, again due to poor design or manufacturing of these devices. In this situation, even if the ASIC was designed to perfectly implement the published protocol, and even if the ASIC was fabricated perfectly, it will still encounter protocol errors due to flaws in the device with which it is communicating.

SUMMARY OF VARIOUS EMBODIMENTS

To address these problems, an HPC system is provided with an ASIC that communicates with another device in the system according to a protocol defined by the other device. The ASIC is coupled to a reconfigurable protocol table, in the form of a high speed content-addressable memory ("CAM"). The CAM includes instructions to control the execution of the protocol by the ASIC. The CAM may include instructions to control the ASIC in the event that unanticipated signals or other errors are encountered while executing the protocol. Internal ASIC state data may be routed to the CAM to permit the ASIC to generate a reasonable response to errors either in the design or fabrication of the ASIC or the device with which it is communicating.

Therefore, a first embodiment has a computing node in a high-performance computing system. The computing node includes an electronic device having a port for communicating using a protocol defined by the electronic device. The node also includes an application-specific integrated circuit (ASIC), coupled to the port, the ASIC having a current protocol state. The node also includes a content-addressable memory (CAM), coupled to the ASIC and storing a protocol table that maps a current protocol state, an ASIC internal state, and a protocol event onto an action and a next protocol state. The ASIC is configured, in response to receiving indication of an event, to take four steps. The first step is to send to the CAM data indicating the current protocol state and the event. The second step is to responsively receive from the CAM data indicating a next protocol state and an action. The third step is to update the current protocol state to be the indicated next protocol state. And the fourth step is to execute the indicated action.

Various modifications to the basic design are contemplated. The electronic device may include a microprocessor, volatile memory, a field-programmable gate array (FPGA), or second ASIC. The protocol may be QPI or HyperTransport. Receiving indication of the event may include receiving a message from the port according to the protocol, receiving a message from an ASIC in a second computing node, or identifying an elapse of a period of time. Executing the indicated action may include sending a message to the port according to the protocol, sending a message to an ASIC in a second computing node, or waiting for a period of time. The ASIC internal state may be one of an arithmetic state, a networking state, a management state, or an error processing state. In some embodiments, the protocol table has data indicating an event that is not defined by the protocol for controlling the ASIC. In this case, the protocol table may encode a plurality of actions to take in response to the event that is not defined by the protocol, each action corresponding to a different ASIC internal state. The indicated action on an initial query may require requerying the CAM to determine which action in the plurality of actions is the best.

Moreover, another embodiment of the invention provides a method of communicating by and between an ASIC and an electronic device according to a protocol defined by the electronic device. The ASIC has a current protocol state. The method includes several steps. The first step is receiving indication in the ASIC of an event. The second step is sending, from the ASIC to a CAM, data indicating the current protocol state, an ASIC internal state, and the event. The third step is responsively receiving, by the ASIC from the CAM, data indicating a next protocol state and an action. The fourth step is updating the current protocol state to be the indicated next protocol state. And the fifth step is executing the indicated action. The method of this embodiment may be modified as described in connection with the computing node above.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Figure 1:
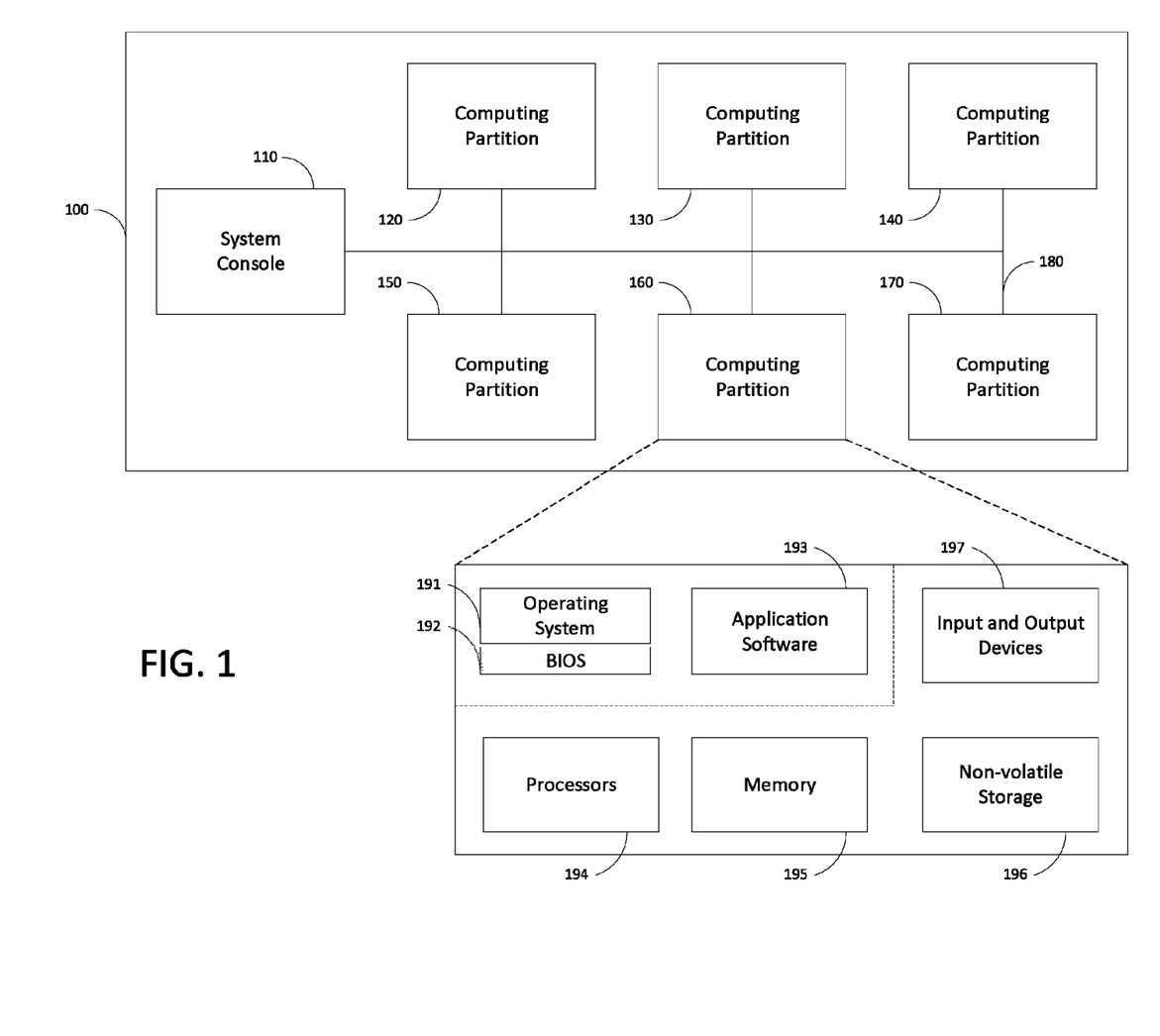
FIG. 1 schematically shows a logical view of an HPC system in accordance with one embodiment of the present invention.

In accordance with various embodiments of the invention, an HPC system is provided with an ASIC that communicates with another device in the system according to a protocol defined by the other device. The ASIC is coupled to a reconfigurable protocol table, in the form of a high speed content-addressable memory ("CAM"). The CAM, which includes instructions to control the execution of the protocol by the ASIC, may include instructions to control the ASIC in the event that unanticipated signals or other errors are encountered while executing the protocol. Internal ASIC state data may be routed to the CAM to permit the ASIC to generate a reasonable response to errors either in the design or fabrication of the ASIC or the device with which it is communicating. Details of illustrative embodiments are discussed below.
System Architecture FIG. 1 schematically shows a logical view of an exemplary high-performance computing system 100 that may be used with illustrative embodiments of the present invention. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
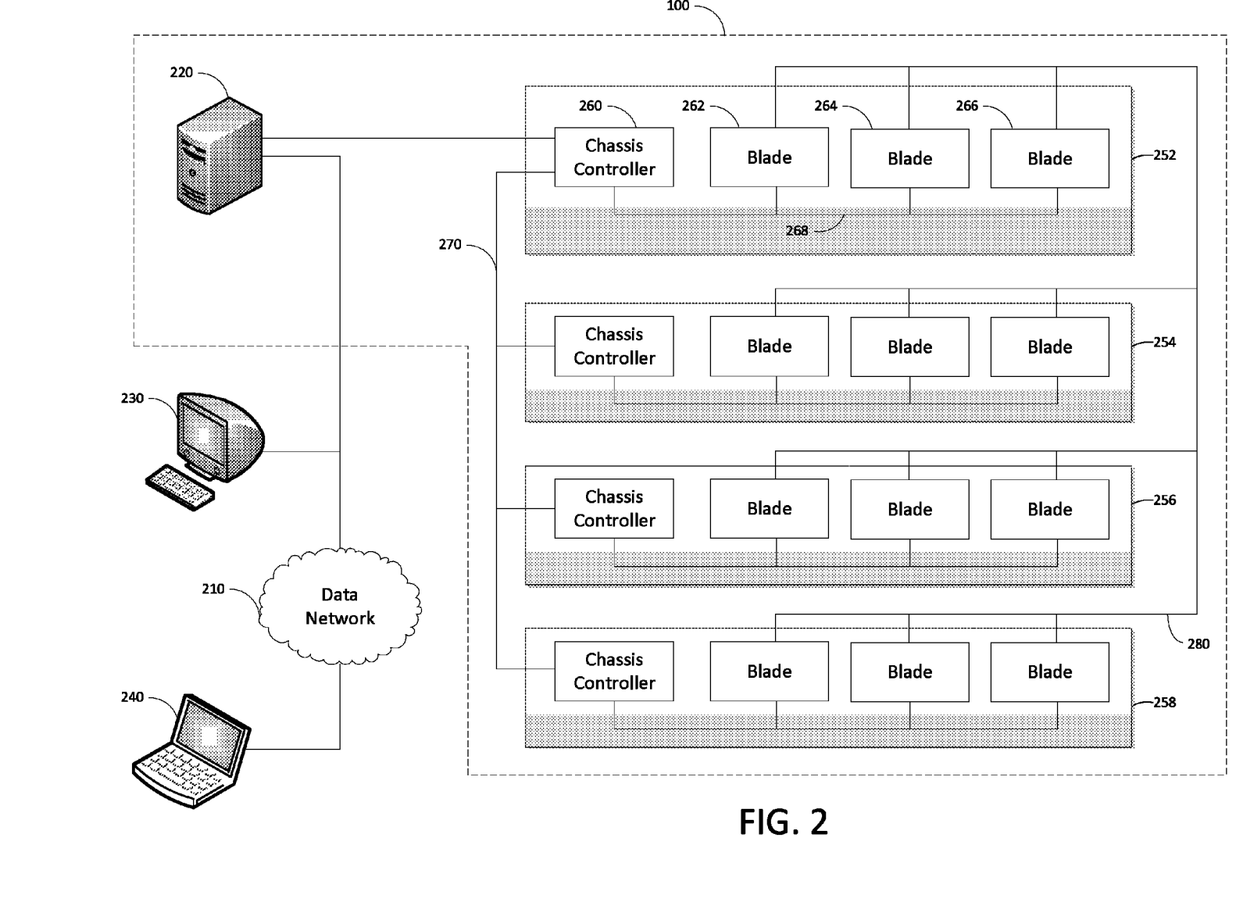
FIG. 2 schematically shows a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to a customer data network 210 to facilitate customer access.

The HPC system 100 includes a system management node ("SMN") 220 that performs the functions of the system console 110. The management node 220 may be implemented as a desktop computer, a server computer, or other similar computing device, provided either by the customer or the HPC system designer, and includes software necessary to control the HPC system 100 (i.e., the system console software).

The HPC system 100 is accessible using the data network 210, which may include any data network known in the art, such as a customer local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by a customer computer 230 by way of remote login using tools known in the art such as Windows®Remote Desktop Services or the Unix secure shell. If the customer is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Fremont, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or a customer computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled computing resources.

Figure 3:
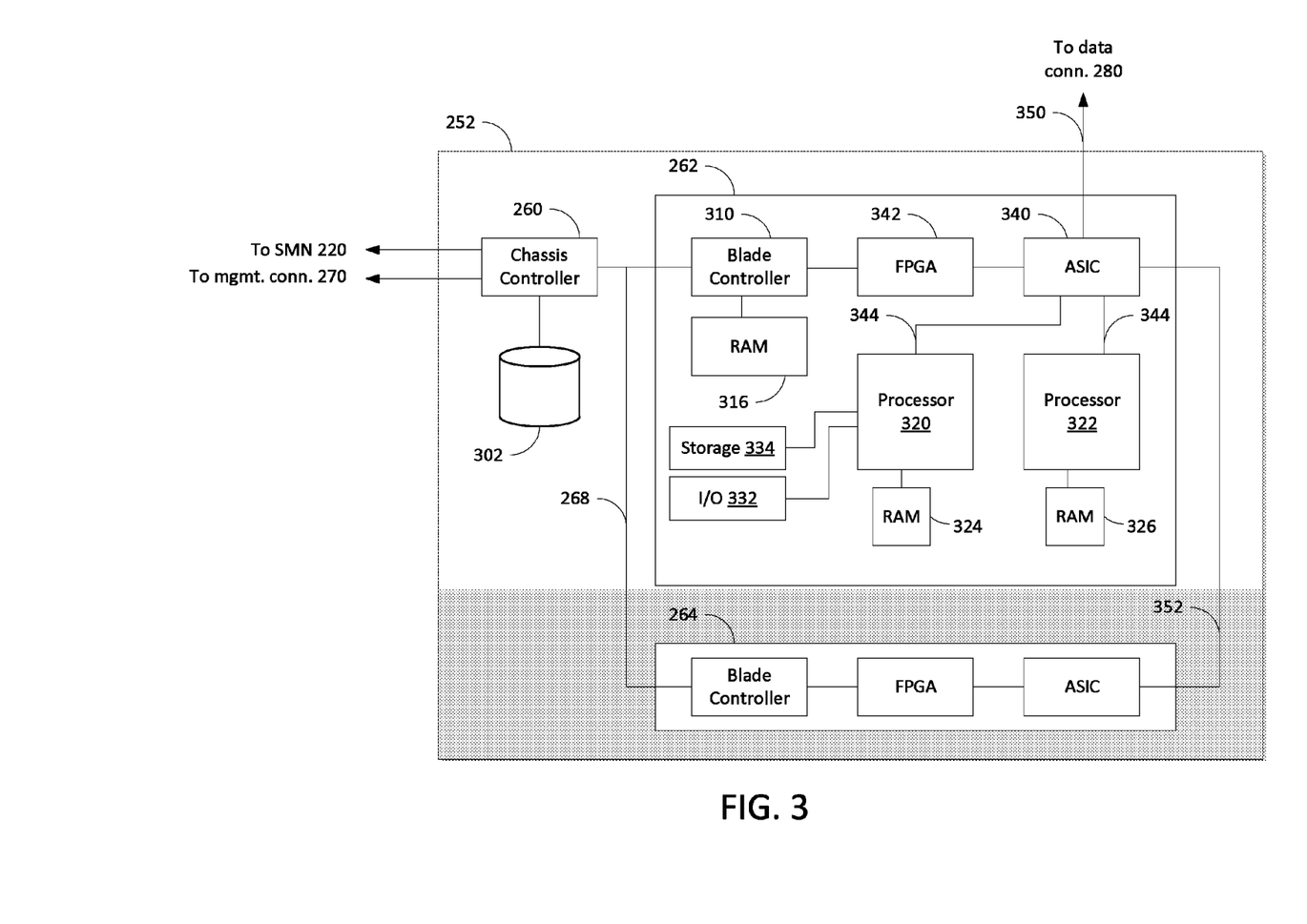
FIG. 3 schematically shows details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more processors 320, 322 that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 by way of a field-programmable gate array ("FPGA") 342 or similar programmable device for passing signals between integrated circuits. In particular, signals are generated on output pins of the blade controller 310, in response to commands issued by the chassis controller 260. These signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

System Operation

System management commands generally propagate from the SMN 220, through the management connection 270 to the blade chassis (and their chassis controllers), then to the blades (and their blade controllers), and finally to the hub ASICS that implement the commands using the system computing hardware.

As a concrete example, consider the process of powering on an HPC system. In accordance with exemplary embodiments of the present invention, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its computing resources may be divided into computing partitions. The quantity of computing resources that are allocated to each computing partition is an administrative decision. For example, a customer may have a number of projects to complete, and each project is projected to require a certain amount of computing resources. Different projects may require different proportions of processing power, memory, and I/O device usage, and different blades may have different quantities of the resources installed. The HPC system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. As is known in the art, a BIOS is a collection of instructions that electrically probes and initializes the available hardware to a known state so that the OS can boot, and is typically provided in a firmware chip on each physical server. However, a single logical computing partition 160 may span several blades, or even several blade chassis. A blade may be referred to as a "computing node" or simply a "node" to emphasize its allocation to a particular partition.

Booting a partition in accordance with an embodiment of the invention requires a number of modifications to be made to a blade chassis that is purchased from stock. In particular, the BIOS in each blade is modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

Reconfigurable Hub Chip Communication Protocols

Communications between electronic devices in the HPC system 100 that are made by different manufacturers often follow a published protocol. Such a protocol may be modeled as a finite state machine ("FSM"). To illustrate the concept, consider a turnstile that guards a subway platform and requires a coin to be inserted as fare. The turnstile may be either locked or unlocked, and starts in a locked state. The turnstile may receive either of two events: a push event in which a person pushes on the locking mechanism to attempt passage onto the platform, and a coin event in which a person inserts a coin to unlock the mechanism.

Figure 7A:
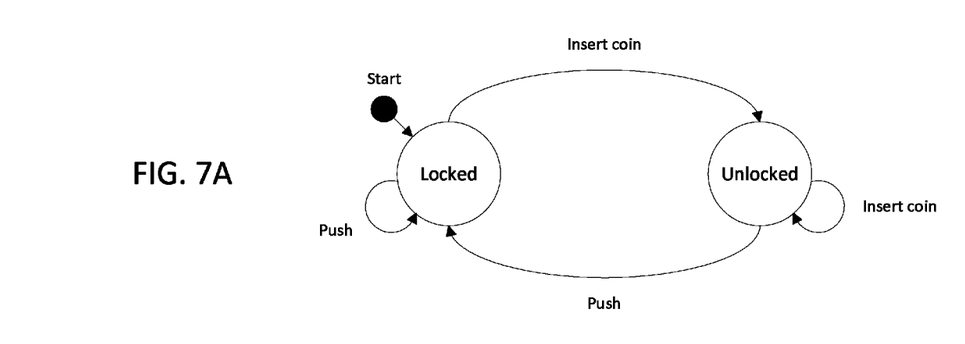
FIGS. 7A and 7B illustrate a simple finite state machine.
Figure 7B:
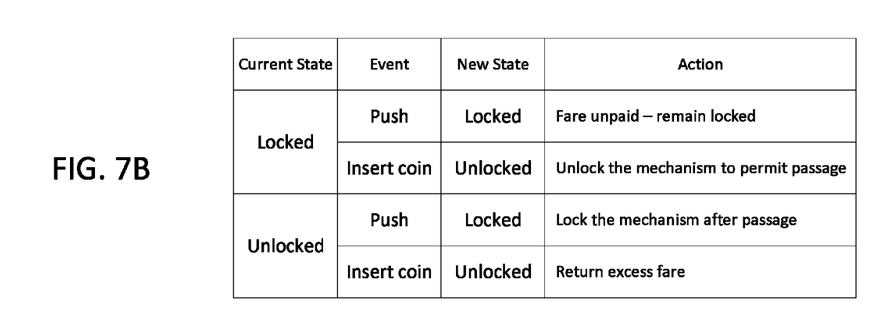

The operation of the turnstile is shown in FIGS. 7A and 7B. FIG. 7A represents the possible states and events of the turnstile as a graph, with a number of nodes representing states, and arrows between the nodes representing events. FIG. 7B represents the same states and events of the turnstile as a table.

If the turnstile is locked (that is, it is in the "locked" state) and a person pushes on it (that is, it receives a "push" event), then it should remain locked because the fare has not yet been paid. This logic is illustrated in FIG. 7A by the looping arrow marked "push" and in FIG. 7B by the first entry in the table. If the turnstile is in the "locked" state but receives a "coin" event, then the fare has been paid so it should unlock the locking mechanism to permit passage. This logic is shown in FIG. 7A by the arrow carrying the device from the "locked" state to the "unlocked" state, and in FIG. 7B by the second entry in the table.

If the turnstile is in the "unlocked" state and receives a "push" event, then after passage has been completed it should re-lock the mechanism to prevent passage by another person, as shown in FIG. 7A by the arrow carrying the device from the "unlocked" state to the "locked" state and in FIG. 7B by the third entry in the table. Finally, if the turnstile is in the "unlocked" state and receives a "coin" event, then excess fare has been paid and should be returned, for example through a coin return mechanism, but the device should remain unlocked.

As just demonstrated, a turnstile can be modeled with a very simple FSM; other protocols have many more states and many more events. More generally speaking, a protocol between two or more devices enumerates a finite list of states, and at any given time a participating device has one of these states. For example, the protocol defines a START state in which a participating device begins. The protocol also enumerates a finite list of events. For example, an event could be defined as receiving a message from another device or identifying an elapse of a period of time. The protocol finally defines a transition map (herein called a "protocol table") that lists, for each current state, an action to take and a new state to enter after the occurrence of each listed event. Actions may include, for example, turning on a light, activating a relay, sending a message to another communicating device, or waiting for a period of time, but electrical circuits may perform many other actions. A protocol table is generally human-readable and is intended to exhaustively define all conditions and behaviors of any device that interfaces to the state machine. Its purposes are to convey the correct behavior to a device designer, and to allow for verification of the protocol by a verification engineer.

In illustrative embodiments of the invention, an ASIC is provided with a reconfigurable protocol table in the form of a high speed content-addressable memory ("CAM"). The CAM includes instructions to control the execution of the protocol by the ASIC. In some embodiments, the CAM also includes instructions to control the ASIC in the event that protocol errors are encountered in the protocol.

Unlike a conventional random-access memory (RAM) circuit that receives a memory address and outputs data, a CAM operates by receiving the data, and outputting one or more entries containing that data. Because the entire memory space is searched at once, a CAM finds data much faster than ordinary RAM, although at an added cost. Some types of CAM are "binary" in that they receive data in the form of binary digits or "bits" (that is, zeroes and ones). Other types of CAM are "ternary" because they receive data in the form of ternary digits or "trits" (that is, zeroes, ones, and "don't cares" typically denoted by the letter X). For example, a ternary CAM may receive a request to search for data matching 'X0X1'; this CAM will output all entries storing the bit patterns 0001, 0011, 1001, or 1011 (i.e., a bit pattern where the second bit is zero, the fourth bit is one, and the other bits don't matter).

Figure 4:
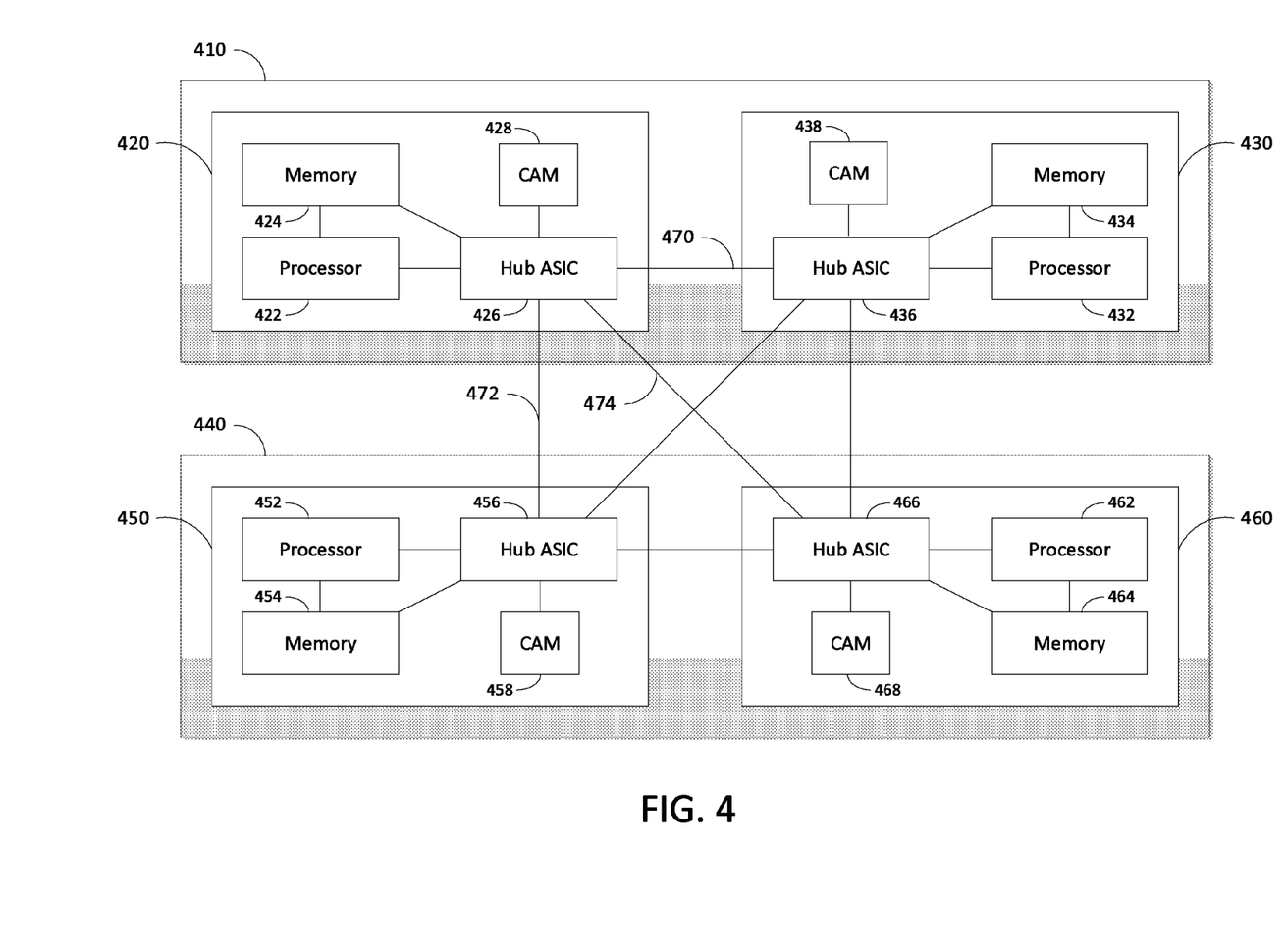
FIG. 4 schematically shows a portion of an HPC system that has a reconfigurable protocol table in accordance with an embodiment of the invention.

FIG. 4 shows a portion of an HPC system that has a reconfigurable protocol table in accordance with an embodiment of the invention. Two chassis 410, 440 are shown. The first chassis 410 includes two nodes 420, 430, while the second chassis 440 includes two nodes 450, 460. Each node 420, 430, 450, 460 respectively contains: a processor 422, 432, 452, 462 coupled to a memory 424, 434, 454, 464, and a hub ASIC 426, 436, 456, 466 coupled to both and having a protocol block that is coupled to a CAM 428, 438, 458, 468. The hub ASICs 426 and 436 are connected using an intra-chassis data connection 470 that may be implemented using a chassis computing connection 352. The hub ASIC 426 is connected to hub ASICs 456, 466 using inter-chassis data connections 472, 474 that may be implemented using a link 350. While FIG. 4 shows each hub ASIC directly connected to each other hub ASIC, a person having ordinary skill in the art should appreciate that a routing fabric may be used instead, to route messages between hub ASICs that are not so connected. Moreover, while FIG. 4 shows the hub ASIC 426 and the CAM 428 as separate circuits for clarity, in some embodiments the CAM 428 forms a functional block inside the hub ASIC 426, so that communications between the CAM 428 and the protocol block occur entirely within the hub ASIC 426.

The construction and operation of each of these nodes is modular; further discussion will be made with principal focus on node 420. The processor 422 may be a general purpose single core or multi-core microprocessor as known in the art, having a port for communicating with other components according to a protocol. The memory 424 may be one or more static RAM chips (SRAM) for high speed and low power consumption, or one or more dynamic RAM chips (DRAM) for reduced cost. The ASIC 426 and the CAM 428 may be fabricated using applicable methods known in the art, and as noted above the CAM 428 may form a functional block of the ASIC 426. Although FIG. 4 shows only one processor 422 in the node 420, a number of processors may be included in some embodiments. In this case, the hub ASIC 426 may be connected to the communications port of each processor to facilitate multi-processor computing.

The logical coupling between the processor 422 and the memory 424 may be made according to a communications protocol such as QPI, HyperTransport, a front-side bus protocol, or other such means. Therefore, in accordance with illustrative embodiments of the invention, the hub ASIC 426 may be designed to communicate with the processor 422 or the memory 424 according to whichever protocol they are using to communicate with each other. If multiple processors 422 are present in a node 420, the hub ASIC 426 may have a current protocol state that is a combination of the protocol states of each individual processor 422. Moreover, the hub ASICs 426, 436, 456, 466 may communicate with each other using another protocol, such as NumaLink. Each of these protocols may be implemented in the hub ASIC 426 using an embodiment of the present invention.

In non-trivial applications, protocol tables generally are compressed. An uncompressed table having an entry for each pairing of a state with an event would require a number of entries equal to the product of the number of states and the number of events, which could be a very large number. Such a table design is inefficient with respect to storage space. Moreover, some protocols do not indicate what happens for each pairing of state and event, leaving the entries for most pairings undefined. Therefore, protocol tables often are compressed in memory, storing only the state-event pairings that make sense for the particular protocol goals. While this compression saves a great deal of storage space and usefully shrinks the table size, it presents a problem that the memory address of any given state-event pairing no longer can be neatly calculated. Therefore, in accordance with illustrative embodiments of the invention, a CAM 428 is used to store entries corresponding to state-event pairings. A laborious search for the correct entry is no longer required, because each entry in the CAM 428 is searched simultaneously, and an output is returned immediately.

Figure 5A:
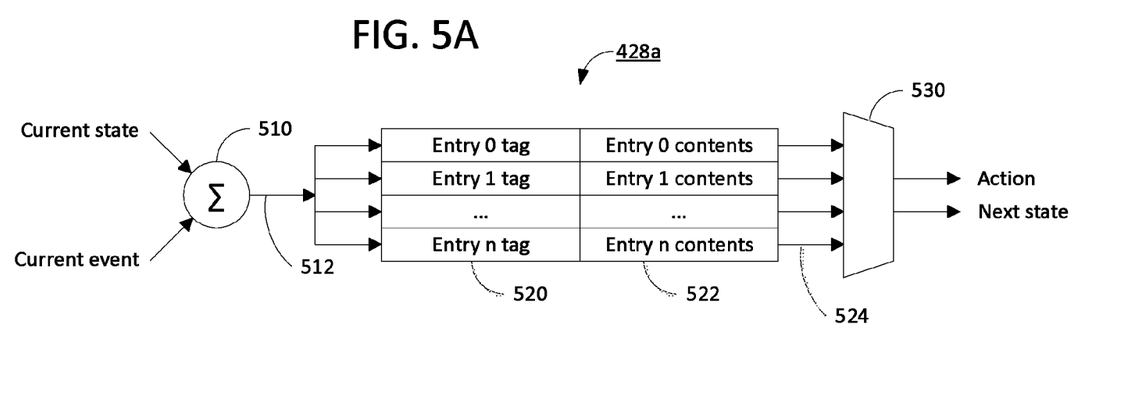
FIG. 5A shows a ternary CAM that stores a protocol table in accordance with an embodiment of the invention.

FIG. 5A shows a ternary CAM 428a that stores a protocol table in accordance with one embodiment of the invention. The CAM 428a is treated as a ternary CAM, although various embodiments may use a binary CAM as well. The protocol table contains a number of entries. To search for a particular entry, the protocol block of the hub ASIC 426 provides a current protocol state and a current protocol event to a combiner 510, which produces a signal 512 having a search tag. The search tag is represented by a number of bits or trits, and the combiner 510 forms the search tag signal 512 by concatenating the current state bits and the current event bits. The search tag signal 512 is presented to the CAM 428a.

The entries in the CAM 428a are searchable using entry tags 520. An entry tag 520 is stored in the CAM 428a as a pattern of bits. The ternary CAM 428a applies the search tag signal 512 substantially simultaneously to each entry, and each entry having an entry tag 520 that matches the search tag provides its contents 522 to the output 524 of the CAM 428a. The contents 522 encode an action to take (which may be a "do nothing" action), and the next protocol state. All of the output signal lines enter into a multiplexer 530 that selects the 'best' entry for output. The protocol block of the hub ASIC 426 receives the contents 522 from the multiplexer 530, decodes the contents 522 into an action and a next state, saves the received state as the current state, and executes the received action. Because the CAM 428a may include a large number of entries, the multiplexer 530 actually may be implemented as a cascading series of multiplexers.

In the usual situation (that is, the CAM 428a has been accurately programmed with the entire protocol and the protocol has been implemented correctly by the other device), exactly one entry will contain the requested data, and the multiplexer 530 will select its signal line 524 for output. If more than one entry contains the requested data, then the CAM 428a was improperly programmed (or the protocol provides for several options, and the multiplexer 530 is programmed to choose the best one). If no entry contains the requested data, then either the CAM 428a was improperly programmed or the hub ASIC 426 received an unexpected event for which there is no matching entry in the protocol table. In either event, illustrative embodiments of the invention provide a CAM 428a that may be programmed when its node 420 initializes.

As noted above, sometimes the device with which the hub ASIC 426 communicates does not implement the complete protocol, or implements the complete protocol improperly. Also, sometimes the hub ASIC 426 is fabricated incorrectly. And sometimes, unanticipated signals are received that disrupt the operation of devices that otherwise are executing the protocol correctly. It may be unclear which action to take, if any, when receiving an unexpected event. Additional information may be required to do the right thing in this case.

The hub ASIC 426 itself includes a great deal of state information outside the protocol block that might be used to resolve a protocol error. The ASIC 426 typically includes a large number of components that are employed in tasks other than executing communications protocols. The physical hub ASIC 426 itself may be laid out in a floor plan, as is known in the art, with its physical area divided into functional areas. These functional areas may include, for example, the communications protocol block already mentioned, an arithmetic and computational area, a networking and routing crossbar area, a management area for processing commands from the FPGA 342, an error processing area, and so on. Each of these functional areas in the floor plan may itself be broken down into subareas and circuits that process individual sub-functions, and these subareas and circuits may have certain states that reflect events outside the strict bounds of the protocol. In accordance with some embodiments of the invention, individual electrical connections in the ASIC provide signals to a subarea debug multiplexer, a collection of subarea multiplexers pass those signals to floor plan multiplexers, and the floor plan multiplexers provide several ASIC signals to a debug multiplexer that may be accessed by a field technician.

These debug data may provide an insight into what went wrong with the protocol. In the case of a known bug in the device with which the ASIC 426 is communicating, the ASIC designer might be able to determine that the circumstances in which the bug manifests itself are uniquely associated with some internal state in the ASIC 426. Combined with a knowledge of the protocol, the ASIC designer might determine an appropriate course of action and a next protocol state that should occur under these circumstances. For example, if the protocol calls for a shared read of remote memory but a remote node indicates that such a shared read is not possible for whatever reason, the best action might be to attempt an exclusive read of the data instead of immediately failing, depending on the internal state of the ASIC. Other such "fallback" modifications may be made to provide full or partial protocol functionality to work around the protocol error, without requiring a redesign and refabricating the hub ASIC 426.

Figure 5B:
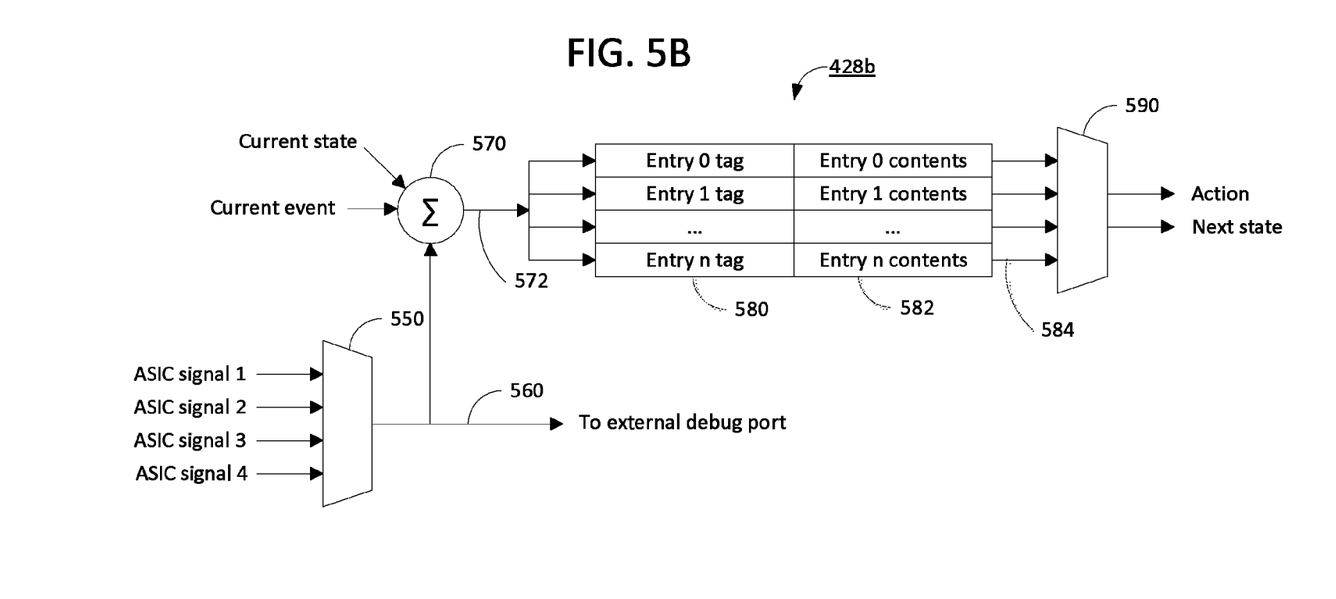
FIG. 5B shows a CAM that stores a modified protocol table in accordance with an embodiment of the invention.

Therefore, FIG. 5B shows a CAM 428b that stores a modified protocol table in accordance with an embodiment of the invention. This embodiment can recover from protocol errors by routing unanticipated signals into the CAM 428b. One or more ASIC signals are provided to a debug multiplexer 550. The output 560 of this multiplexer is sent to an external debug port, for instance a serial port that may be connected to an external debugger. The debug port is not used during normal operation, but if a protocol error is identified, the ASIC designer can use it to determine why the error occurred, and whether certain ASIC internal states uniquely correspond to the error condition. If so, the ASIC designer may reprogram the protocol table so that certain entry tags 580 include some number of ASIC state bits in the output 560, and the entry contents 582 encode an appropriate action and next state. The appropriate action in case of a protocol error may be, for example, to place the processor into a single-stepping mode, choose certain ASIC signals to present the multiplexer 550 for output 560 on the debug port, signal a system operator about the protocol error, or take other such steps.

The embodiment of FIG. 5B sends the current state and current event to a combiner 570, but unlike the embodiment of FIG. 5A, it also sends some bits representative of the ASIC internal state to the combiner 570. The combiner 570 then concatenates bits indicating the current protocol state, the current event, and the output 560 to form a search tag signal 572. The CAM 428b uses the search tag to locate one or more entries 580, as before. If multiple entries respond to the search tag, the multiplexer 590 selects the best responding entry 584 for output.

There are at least two different ways that the contents of the CAM 428a, 428b can be initialized. One way is to program it at power-on via an interface such as the method of storing firmware defined by the Joint Test Action Group (JTAG) in IEEE standard 1149.1, which would be available prior to the ASIC 426 becoming fully operational. An alternative would be to connect the CAM 428a, 428b to a chip reset signal, which, when asserted, would initialize the contents to a minimal protocol subset that would allow initial processor code fetches and accesses to memory mapped registers. That would allow the BIOS to boot and then fully initialize the CAM via writes to the memory mapped registers.

The protocol table stored in the CAM 428b may be modified in a number of different ways. In one embodiment, the CAM 428b is large and the protocol table is small. In this embodiment, each entry in the unmodified protocol table is expanded as a function of each possible input ASIC state signal 560. In order to prevent the expanded table from growing beyond the size of the CAM 428b, some small number of bits of ASIC state, say four bits, may be used. In this case, the size of the protocol table grows by a factor of the fourth power of two, or 16.

In another embodiment, the protocol table is so large that its size cannot be expanded without exceeding the size of the CAM 428b. In this case, the protocol table may be expanded to include only certain exceptional cases. For instance, suppose it is known that a memory fetch event in a certain protocol state is broken when the memory address is odd (i.e., the lowest bit of the address is a one rather than a zero). The hub ASIC 426 can provide the lowest address bit to multiplexer 550, and this bit is included in the search tag 572 sent to the CAM 428b.

For exceptional cases where the correct behavior is not the behavior defined by the protocol, there are a number of options. If only one correct behavior exists but this differs from the published protocol (for example if an entire line of processors has the same bug in its implementation of the protocol), that alternate behavior simply can be defined in the table without requiring the use of the debug output 560. In fact, this situation may use the embodiment of FIG. 5A. However, if there is a choice of correct next states and actions based on some other information, then the entry for the particular combination of state and event is multiplied to several entries in the modified protocol table, each entry additionally specifying a particular pattern of bits in the debug output 560 and the correct behavior when that pattern is encountered.

For most states and events in the protocol, the debug signal bits 560 are not required, so the default behavior of the combiner 570 can be to mark the debug bits 560 as "don't care" bits when forming the search tag 572. For exceptional cases having more than one correct behavior, the contents 584 of multiple entries are presented to the output multiplexer 590.

This condition may trigger an action where the CAM 428*b* is queried again, but this time with the combiner 570 forming the search tag 572 using the actual values of debug bits 560, instead of using "don't care" bits. After being required, only one entry in the CAM 428*b* will respond with its contents, thereby determining which action is the best. In this way, only the exceptional entries are multiplied, rather than multiplying all entries in the table. The table size can be kept small, at the expense of requiring two lookups in the CAM 428*b* instead of only one. However, this overhead is not excessive because it only occurs in exceptional cases, and the CAM 428*b* queries each entry simultaneously, so this process is much faster than using ordinary RAM.

Figure 6:
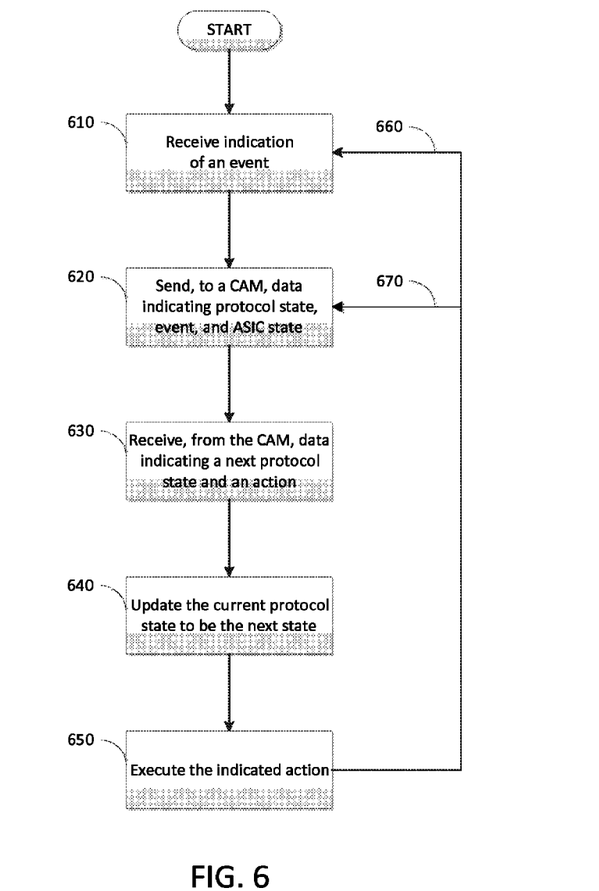
FIG. 6 shows a flowchart of a method of using a CAM according to an embodiment of the invention.

FIG. 6 shows a flowchart of a method of using a CAM according to an embodiment of the invention. The method begins in a process 610, in which a hub ASIC receives an indication of an event. The event may be, for example, passage of a given amount of time, or receipt of a protocol message from a microprocessor, volatile memory, FPGA, or another ASIC. The method continues in process 620, in which the protocol block of the hub ASIC sends, to the CAM, data indicating the current protocol state, the event, and an ASIC internal state as described above in more detail. In process 630, the protocol block receives, from the CAM, data indicating a next protocol state and an action to take. In process 640, the protocol block updates its current protocol state to be the indicated next state. Then, in process 650, the hub ASIC executes the indicated action. In the usual situation, the action will be performed and execution of the method will continue with process 610 again, as indicated by arrow 660. However, as noted above, if the combiner 570 has used "don't care" bits to represent the ASIC internal state, the indicated action might be to requery the CAM in process 620 using a search tag that includes the actual hub ASIC state, as indicated by arrow 670. In this case, no further event needs to be indicated before the processes 620-650 are executed again.

Although the above discussion discloses various exemplary embodiments of the invention, it should be apparent that those skilled in the art can make various modifications that will achieve some of the advantages of the invention without departing from the true scope of the invention.

What is claimed is:

1. A computing node in a high-performance computing system, the computing node comprising:
    an electronic device having a port for communicating using a protocol defined by the electronic device;
    an application-specific integrated circuit (ASIC), coupled to the port, the ASIC having a protocol block for implementing an inter-ASIC communications protocol that has a current protocol state and at least one other functional block for implementing an intra-ASIC function that has an internal state; and
    a content-addressable memory (CAM), coupled to the protocol block of the ASIC, the CAM storing a protocol table that maps a current protocol state, an ASIC internal state, and a protocol event onto an action and a next protocol state;
    the ASIC being configured, in response to receiving indication of an event, to:
    send to the CAM data indicating the current protocol state, a portion of the internal state of the intra-ASIC function, and the event,
    responsively receive from the CAM data indicating a next protocol state and an action,
    update the current protocol state to be the indicated next protocol state, and execute the indicated action;
    and wherein the protocol includes QPI or HyperTransport.

2. The computing node of claim 1, wherein the electronic device includes a microprocessor, a volatile memory, an FPGA, or a second ASIC.

3. The computing node of claim 1, wherein receiving indication of the event includes receiving a message from the port according to the protocol, receiving a message from an ASIC in a second computing node, or identifying an elapse of a period of time.

4. The computing node of claim 1, wherein executing the indicated action includes sending a message to the port according to the protocol, sending a message to an ASIC in a second computing node, or waiting for a period of time.

5. The computing node of claim 1, wherein the internal state of the intra-ASIC function is one of an arithmetic state, a routing state, a management state, or an error processing state.

6. The computing node of claim 1, wherein the protocol table includes data indicating an event that is not defined by the protocol.

7. The computing node of claim 6, wherein the protocol table encodes a plurality of actions to take in response to the event that is not defined by the protocol, each action corresponding to a different ASIC internal state.

8. The computing node of claim 7, wherein the indicated action includes requerying the CAM to determine which action in the plurality of actions is the best.

9. A method of communicating by and between an ASIC and an electronic device according to a protocol defined by the electronic device, the ASIC having a protocol block for implementing an inter-ASIC communications protocol that has a current protocol state, and at least one other functional block for implementing an intra-ASIC function that has an internal state, the method comprising:
    receiving indication in the ASIC of an event;
    sending, from the protocol block to a CAM, data indicating the current protocol state, an portion of the internal state of the intra-ASIC function, and the event;
    responsively receiving, by the protocol block from the CAM, data indicating a next protocol state and an action;
    updating the current protocol state to be the indicated next protocol state; and executing the indicated action; and
    wherein the protocol includes QPI or HyperTransport.

10. The method of claim 9, wherein the electronic device includes a microprocessor, a volatile memory, an FPGA, or a second ASIC.

11. The method of claim 9, wherein receiving indication of the event includes receiving a message from the electronic device according to the protocol, receiving a message from an ASIC in a second computing node, or identifying an elapse of a period of time.

12. The method of claim 9, wherein executing the indicated action includes sending a message to the electronic device according to the protocol, sending a message to an ASIC in a second computing node, or waiting for a period of time.

13. The method of claim 9, wherein the internal state of the intra-ASIC function is one of an arithmetic state, a routing state, a management state, or an error processing state.

14. The method of claim 9, wherein the protocol table includes data indicating an event that is not defined by the protocol.

15. The method of claim 14, wherein the protocol table encodes a plurality of actions to take in response to the event that is not defined by the protocol, each action corresponding to a different ASIC internal state.

16. The method of claim 15, wherein the indicated action includes requerying the CAM to determine which action in the plurality of actions is the best.

\* \* \* \* \*